United States Patent
Lee

(10) Patent No.: US 9,479,662 B1
(45) Date of Patent: Oct. 25, 2016

(54) ADJUSTABLE SCANNING DEVICE

(71) Applicant: Foxlink Image Technology Co., Ltd., New Taipei (TW)

(72) Inventor: Yung Wen Lee, New Taipei (TW)

(73) Assignee: FOXLINK IMAGE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/073,589

(22) Filed: Mar. 17, 2016

(51) Int. Cl.
*H04N 1/04* (2006.01)
*H04N 1/00* (2006.01)

(52) U.S. Cl.
CPC ...... *H04N 1/00716* (2013.01); *H04N 1/00551* (2013.01); *H04N 1/00559* (2013.01); *H04N 1/00729* (2013.01); *H04N 1/00779* (2013.01); *H04N 1/04* (2013.01); *H04N 2201/0081* (2013.01)

(58) Field of Classification Search
CPC ............. H04N 1/00716; H04N 1/00551; H04N 1/00559
USPC ........................... 358/496, 498, 408
See application file for complete search history.

(56) References Cited

U.S. PATENT DOCUMENTS

| | | | | | |
|---|---|---|---|---|---|
| 4,970,606 | A | * | 11/1990 | Shima | H04N 1/03 358/474 |
| 5,267,058 | A | * | 11/1993 | Sata | H04N 1/0057 358/496 |
| 5,764,382 | A | * | 6/1998 | Shiraishi | G03B 27/52 355/407 |
| 5,903,365 | A | * | 5/1999 | Iwata | B41J 13/103 358/496 |
| 5,973,799 | A | * | 10/1999 | Gatto | H04N 1/00127 358/498 |
| 7,414,763 | B2 | * | 8/2008 | Jo | H04N 1/1215 358/474 |
| 7,715,064 | B2 | * | 5/2010 | Yoshida | H04N 1/00602 358/474 |
| 8,730,537 | B2 | * | 5/2014 | Lien | H04N 1/00013 355/23 |
| 2009/0021799 | A1 | * | 1/2009 | Os | H04N 1/00827 358/474 |
| 2010/0321745 | A1 | * | 12/2010 | Van Os | H04N 1/0049 358/498 |

* cited by examiner

*Primary Examiner* — Cheukfan Lee
(74) *Attorney, Agent, or Firm* — WPAT, P.C., Intellectual Property Attorneys; Anthony King

(57) ABSTRACT

An adjustable scanning device includes a base, a first contact sensor mounted to the base and exposed to a top surface of the base, a cover mounted on the base and located above the first contact sensor, and a second contact sensor. The second contact sensor is movably mounted to the cover up and down, and exposed to a bottom surface of the cover. The second contact sensor is located over the first contact sensor to form an adjustable scanning path located between the second contact sensor and the first contact sensor. A width of the adjustable scanning path is adjustable.

12 Claims, 16 Drawing Sheets

ADJUSTABLE SCANNING DEVICE

BACKGROUND OF THE INVENTION

1. Field of the Invention

The present invention generally relates to a scanning device, and more particularly to an adjustable scanning device.

2. The Related Art

A conventional scanning device includes a base, a first contact sensor, a cover and a second contact sensor. The first contact sensor is mounted to the base. The second contact sensor is mounted to a bottom surface of the cover. The cover is pivotally mounted to the base and located above the first contact sensor. A scanning path is formed between the first contact sensor and the second contact sensor for making scanning objects pass through the scanning path and be scanned separately.

However, the scanning objects have different thicknesses. The scanning objects are usually a piece of paper, a bank card, etc. The piece of paper and the bank card have a great thickness difference. If a width of the scanning path is smaller and constant, when a thicker card, especially the bank card with embossed words, passes through the scanning path, the thicker card will be tilted or enter unsuccessfully on account of the thicker card being located between and seriously rubbing against the first contact sensor and the second contact sensor, so an effective scanning has no way of being proceeded. If the width of the scanning path is larger and constant, when the piece of paper with a smaller thickness passes through the scanning path, a distance between the piece of paper and the second contact sensor is larger to cause an image out of focus.

So an innovative adjustable scanning device is essential to be provided, a width of a scanning path of the innovative adjustable scanning device is adjustable according to needs for satisfying various requirements of users.

SUMMARY OF THE INVENTION

An object of the present invention is to provide an adjustable scanning device.

The adjustable scanning device includes a base, a first contact sensor mounted to the base and exposed to a top surface of the base, a cover mounted on the base and located above the first contact sensor, and a second contact sensor. The second contact sensor is movably mounted to the cover up and down, and exposed to a bottom surface of the cover. The second contact sensor is located over the first contact sensor to form an adjustable scanning path located between the second contact sensor and the first contact sensor. A width of the adjustable scanning path is adjustable.

As described above, the width of the adjustable scanning path located between the second contact sensor and the first contact sensor is adjustable according to needs by virtue of the second contact sensor being movably mounted to the cover up and down and the second contact sensor being located over the first contact sensor, so scanning objects with different thicknesses are capable of passing through the adjustable scanning path successfully for proceeding an effective scanning. As a result, various requirements of users are satisfied.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
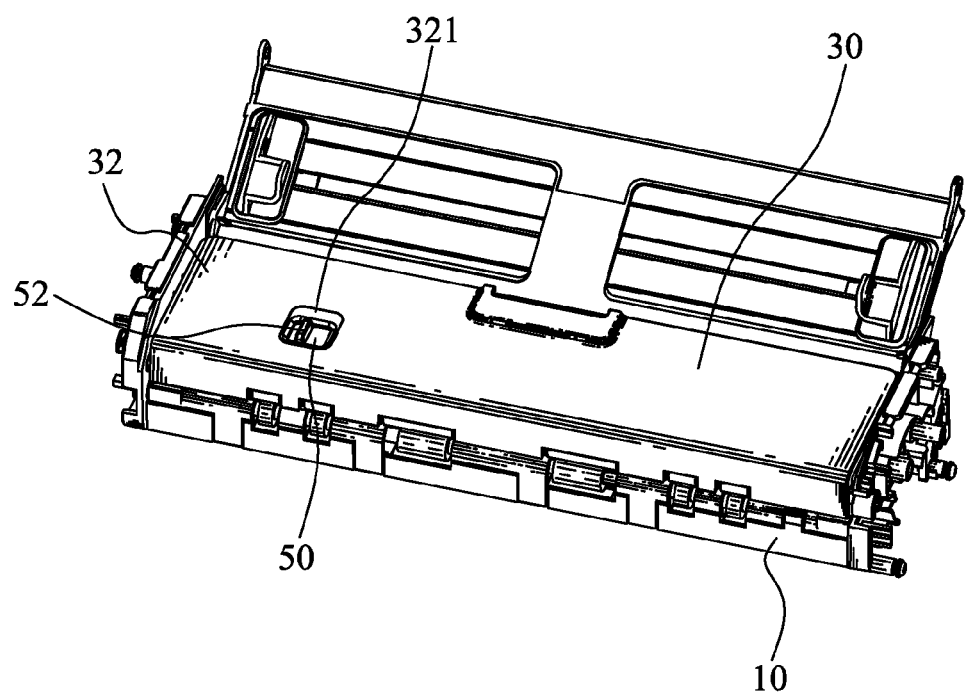
FIG. 1 is a perspective view of an adjustable scanning device in accordance with an embodiment of the present invention.
Figure 2:
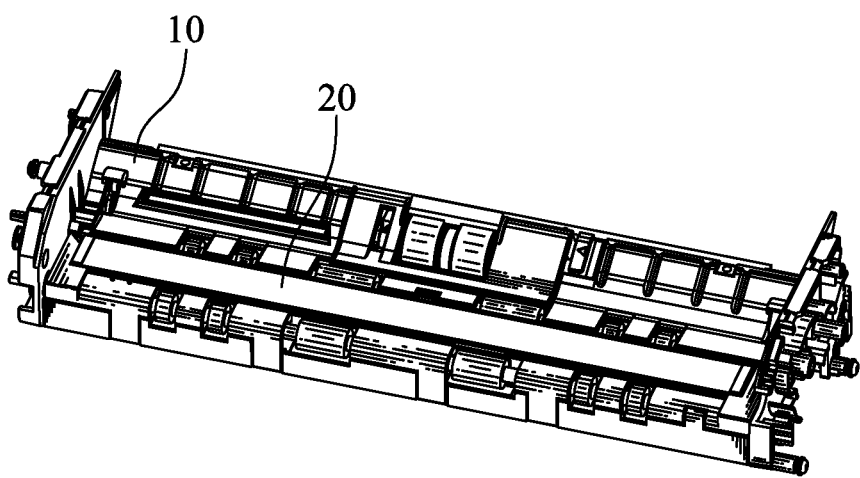
FIG. 2 is a perspective view showing that a first contact sensor is mounted to a base of the adjustable scanning device of FIG. 1.
Figure 3:
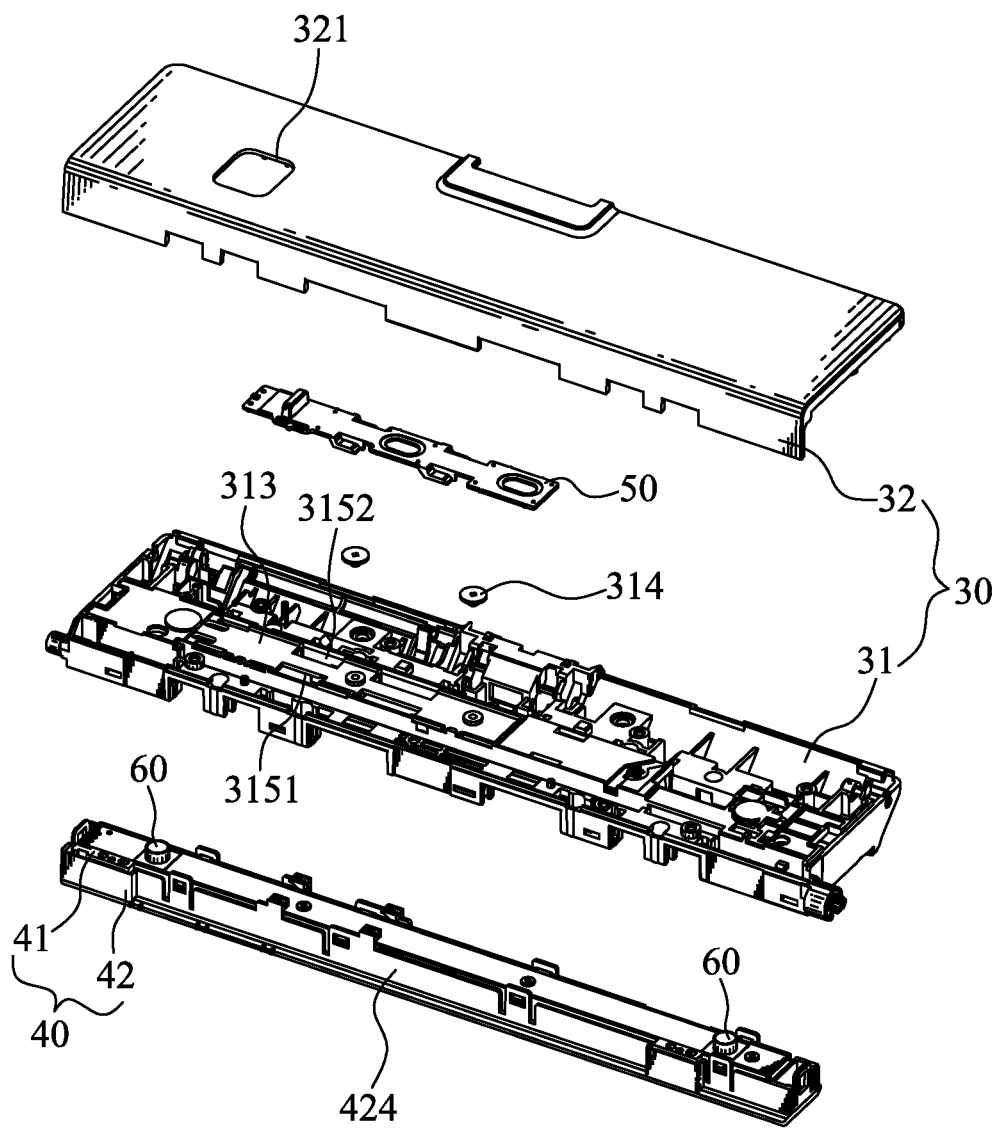
FIG. 3 is a partially exploded view of the adjustable scanning device of FIG. 1.
Figure 4:
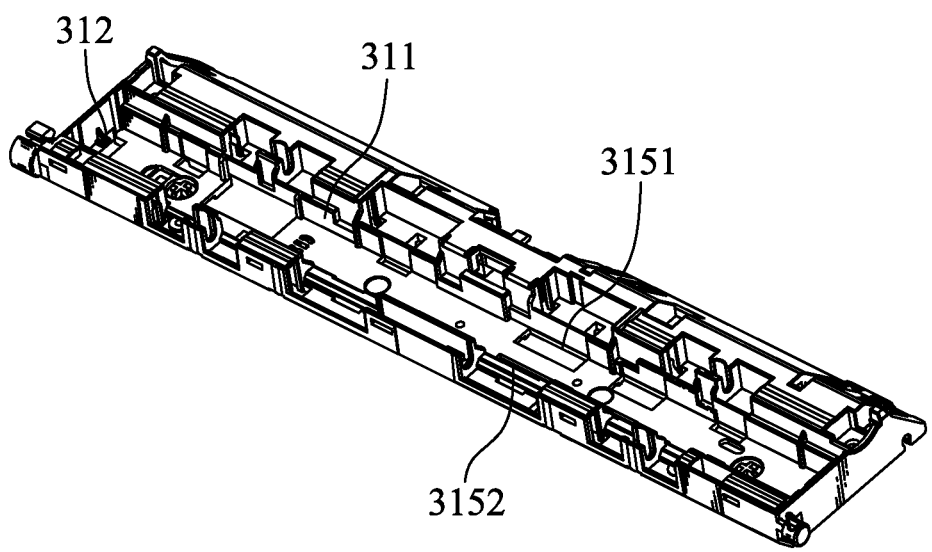
FIG. 4 is a perspective view of an inner cover of the adjustable scanning device of FIG. 1.
Figure 5:
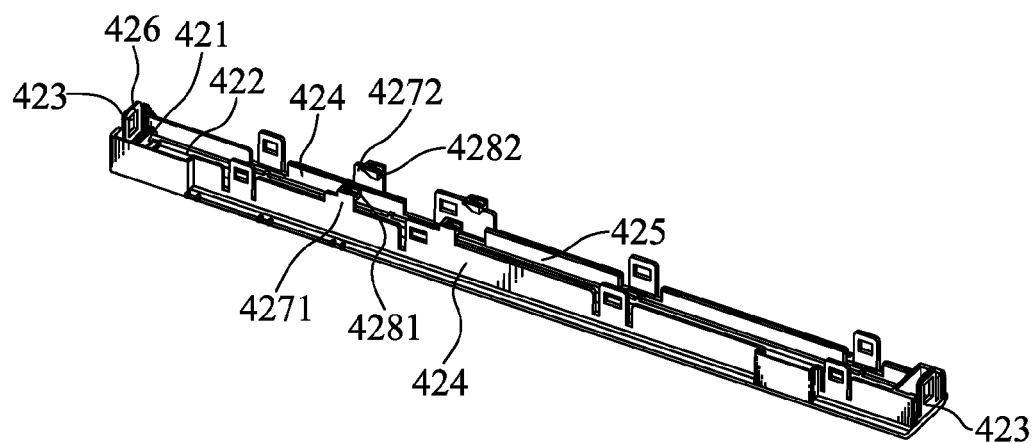
FIG. 5 is a perspective view of a fixing frame of the adjustable scanning device of FIG. 1.

With reference to FIG. 1, FIG. 2 and FIG. 3, an adjustable scanning device 100 in accordance with an embodiment of the present invention is shown. The adjustable scanning device 100 includes a base 10, a first contact sensor 20, a cover 30, a second contact sensor 40, an adjusting switch 50 and two springs 60.

Referring to FIG. 1, FIG. 2, FIG. 3, FIG. 4 and FIG. 8, the first contact sensor 20 is mounted to the base 10 and exposed to a top surface of the base 10. The cover 30 is mounted on the base 10 and located above the first contact sensor 20. Specifically, the cover 30 includes an inner cover 31 and an outer cover 32. The inner cover 31 is pivotally mounted to the base 10 and located above the first contact sensor 20. A substantial middle of a bottom surface of the inner cover 31 is recessed inward to form an assembling groove 311 extending transversely and located over the first contact sensor 20.

Two side walls of the assembling groove 311 protrude inward to form two limiting blocks 312. A top wall of the assembling groove 311 opens a first perforation 3151 and a second perforation 3152 arranged longitudinally. A portion of a top surface of the top wall of the assembling groove 311 is recessed downward to form a receiving groove 313. The first perforation 3151 and the second perforation 3152 are opened in the receiving groove 313. The inner cover 31 is equipped with a limiting screw 314 in the receiving groove 313. In this embodiment, the top wall of the assembling groove 311 opens two first perforations 3151 arranged transversely and two second perforations 3152 arranged transversely. The two second perforations 3152 are located behind the two first perforations 3151. The outer cover 32 is covered on the inner cover 31. The outer cover 32 opens an opening 321.

Referring to FIG. 3, FIG. 5, FIG. 9 and FIG. 10, the second contact sensor 40 includes a main portion 41 and a hollow fixing frame 42. The fixing frame 42 has a bottom board 421. A middle of the bottom board 421 opens a through-hole 422. Two opposite sides of the bottom board 421 protrude upward to form two first lateral walls 423. A front and a rear of the bottom board 421 protrude upward to form two second lateral walls 424. A receiving space 425 is surrounded among the bottom board 421, the two first lateral walls 423 and the two second lateral walls 424. The two first lateral walls 423 define two limiting holes 426, respectively. Tops of a front and a rear of the second contact sensor 40 have a first guiding block 4281 and a second guiding block 4282, respectively. Tops of a front and a rear of the fixing frame 42 have a first extending arm 4271 and a second extending arm 4272, respectively. The first extending arm 4271 and the second extending arm 4272 are respectively protruded upward from tops of the two second lateral walls 424. In this embodiment, the first extending arm 4271 and the second extending arm 4272 have the same structure. The first extending arm 4271 and the second extending arm 4272 face each other.

A top end of an inner surface of the first extending arm 4271 protrudes inward to form the first guiding block 4281. A top end of an inner surface of the second extending arm 4272 protrudes inward to form the second guiding block 4282. A bottom surface of each of the first guiding block 4281 and the second guiding block 4282 is of a stair shape. The bottom surface of each of the first guiding block 4281 and the second guiding block 4282 has a blocking surface 43, a guiding surface 45 inclined downward and sideward from a tail end of the blocking surface 43, and a horizontal supporting surface 44 extended sideward and substantially opposite to the blocking surface 43 from a tail end of the guiding surface 45. Specifically, four portions of the tops of the two second lateral walls 424 protrude upward to form two first extending arms 4271 and two second extending arms 4272. The two second lateral walls 424 have the two first extending arms 4271 and the two second extending arms 4272, respectively. The two first extending arms 4271 face to the two second extending arms 4272, respectively. A top end of an inner surface of each of the two first extending arms 4271 protrudes inward to form the first guiding block 4281. A top end of an inner surface of each of the two second extending arms 4272 protrudes inward to form the second guiding block 4282. The main portion 41 is mounted to the fixing frame 42. The main portion 41 is assembled in the receiving space 425. A bottom surface of the main portion 41 is exposed to a bottom surface of the bottom board 421 through the through-hole 422.

Referring to FIG. 1, FIG. 2, FIG. 3, FIG. 4, FIG. 5, FIG. 8 and FIG. 9, the second contact sensor 40 is movably mounted to the cover 30 up and down, and exposed to a bottom surface of the cover 30. The fixing frame 42 of the second contact sensor 40 is movably mounted to the cover 30 up and down. The second contact sensor 40 is located over the first contact sensor 20 to form an adjustable scanning path 70 located between the second contact sensor 40 and the first contact sensor 20. A width of the adjustable scanning path 70 is adjustable.

Specifically, the second contact sensor 40 is movably assembled in the assembling groove 311 of the inner cover 31 and partially exposed out from the bottom surface of the inner cover 31. The fixing frame 42 is movably assembled in the assembling groove 311 of the inner cover 31 up and down. The two first lateral walls 423 are movably mounted to the two limiting blocks 312 up and down, respectively by virtue of the two limiting holes 426 of the two first lateral walls 423 movably limiting the two limiting blocks 312 up and down. The bottom surface of the bottom board 421 is exposed to the bottom surface of the inner cover 31. The first extending arm 4271 together with the first guiding block 4281 is received in the first perforation 3151. The second extending arm 4272 together with the second guiding block 4282 is received in the second perforation 3152. The two springs 60 elastically abut between the second contact sensor 40 and the inner cover 31. The two springs 60 respectively abut between a top surface of the main portion 41 and the bottom surface of the inner cover 31.

Figure 6:
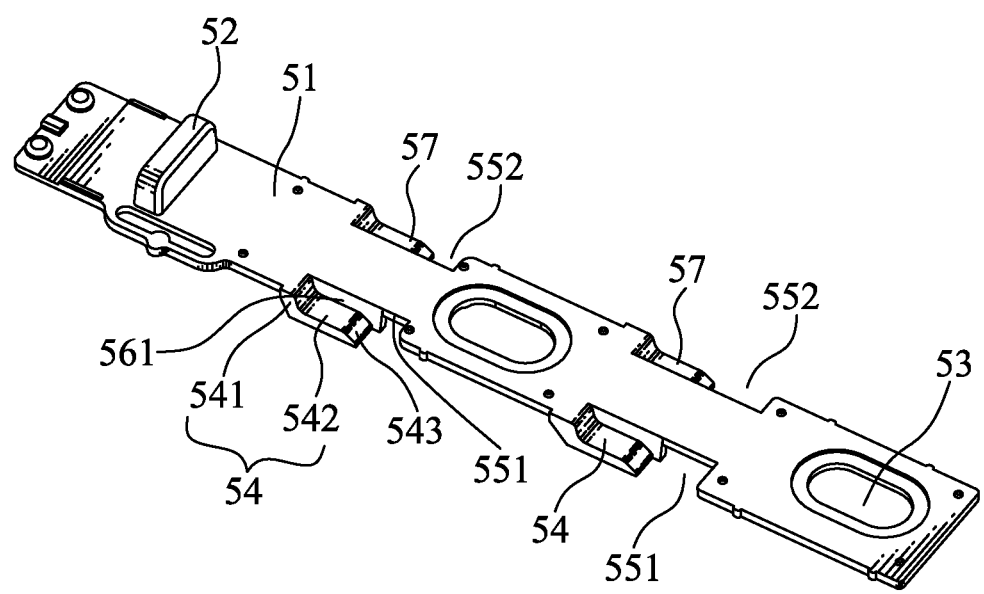
FIG. 6 is a perspective view of an adjusting switch of the adjustable scanning device of FIG. 1.
Figure 7:
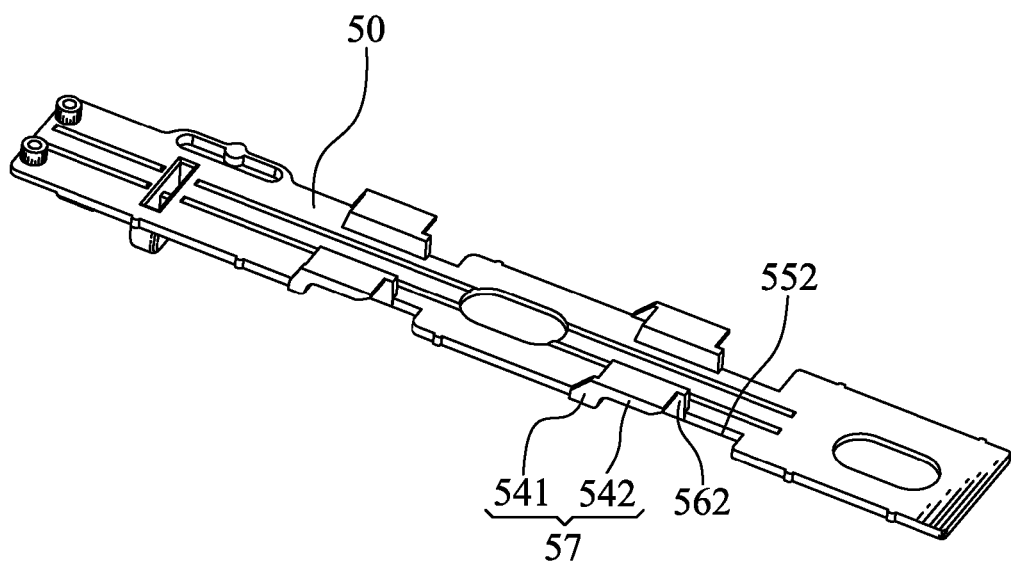
FIG. 7 is another perspective view of the adjusting switch of the adjustable scanning device of FIG. 1.
Figure 8:
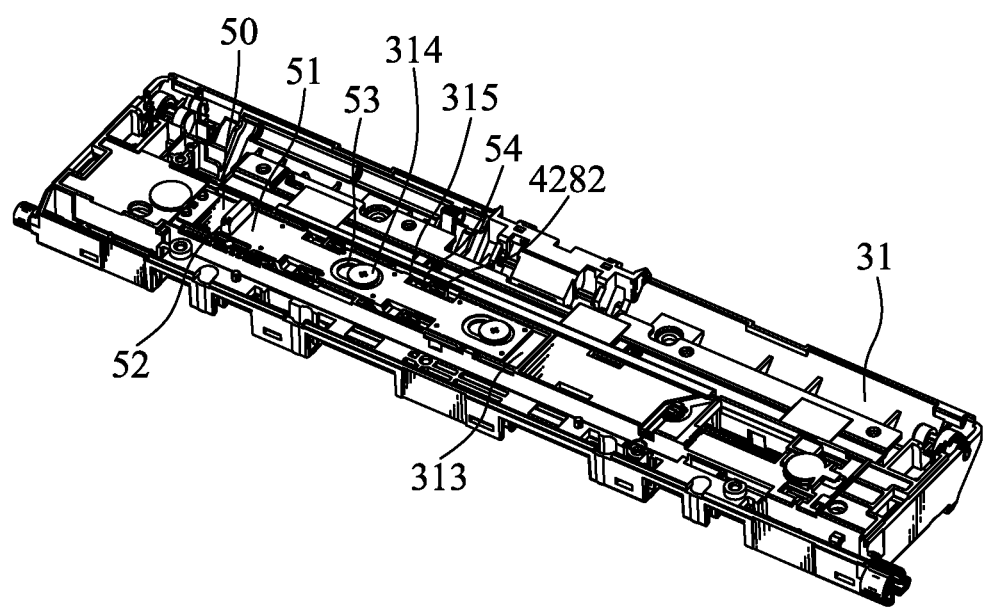
FIG. 8 is a partially perspective view of the adjustable scanning device of FIG. 1, wherein a second contact sensor and the adjusting switch are assembled to the inner cover.
Figure 9:
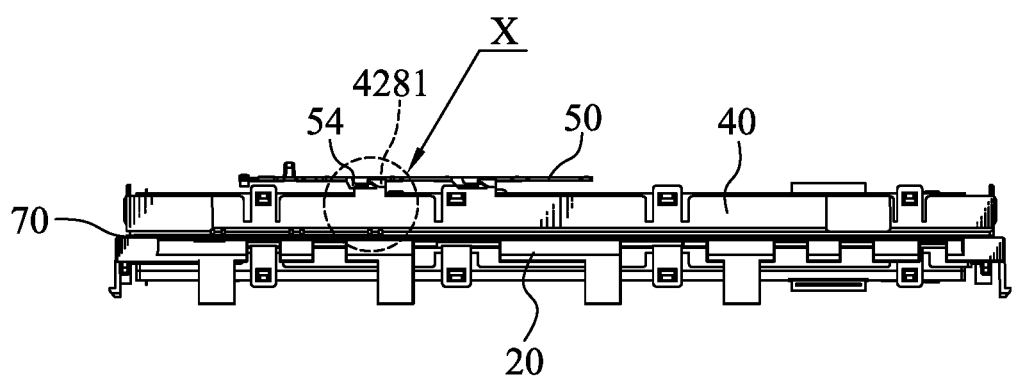
FIG. 9 is a schematic diagram of the adjustable scanning device of FIG. 1 showing that the first contact sensor, the second contact sensor, and the adjusting switch before being adjusted.
Figure 10:
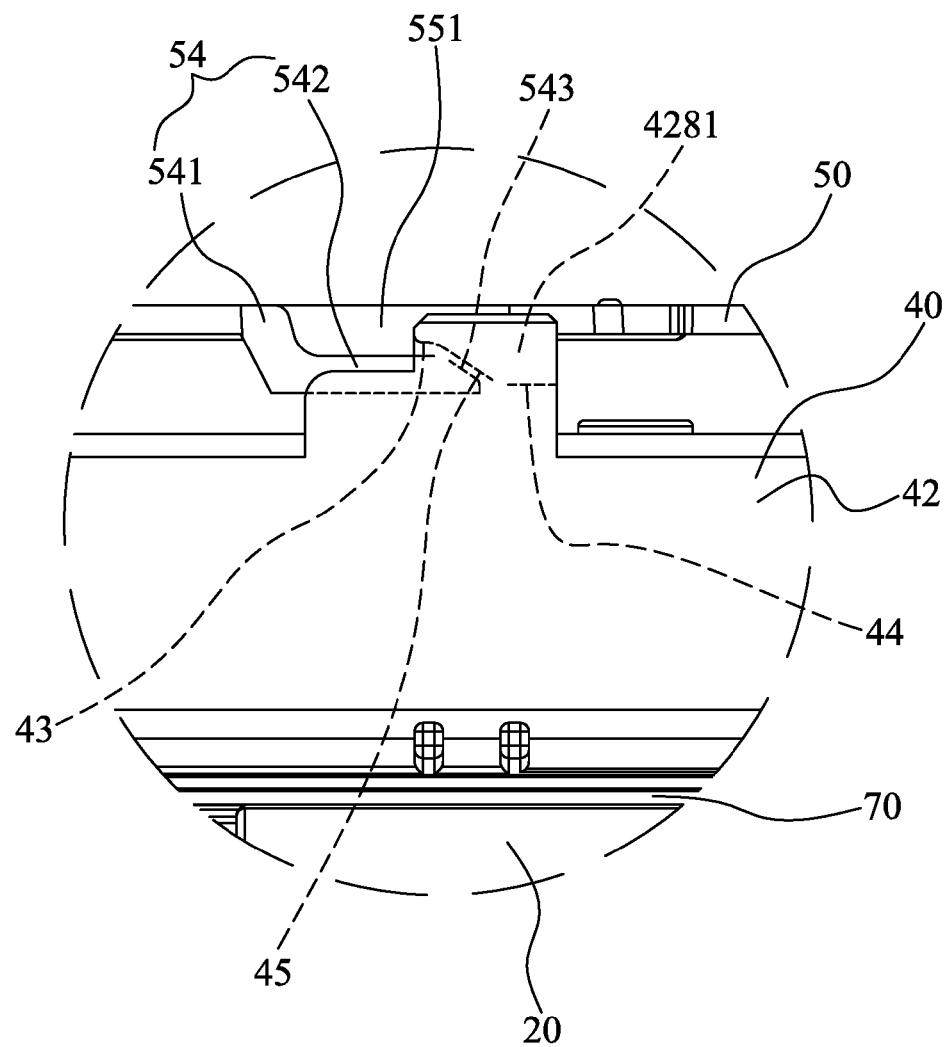
FIG. 10 is an enlarged view of an encircled portion X of the adjustable scanning device of FIG. 9.
Figure 11:
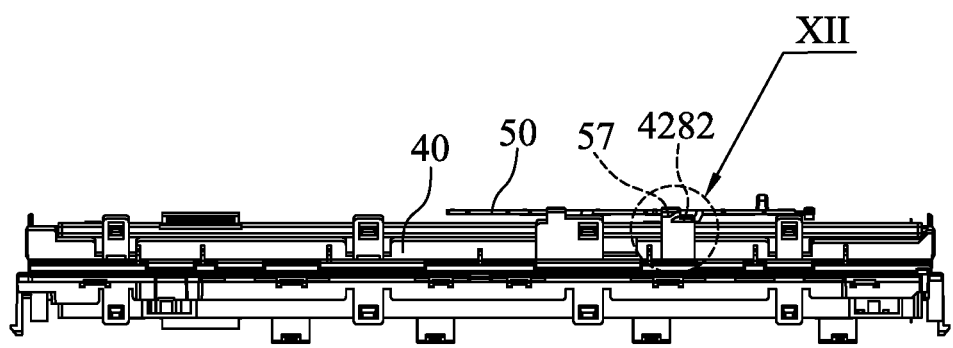
FIG. 11 is another schematic diagram of the adjustable scanning device of FIG. 1 showing that the first contact sensor, the second contact sensor, and the adjusting switch before being adjusted.
Figure 12:
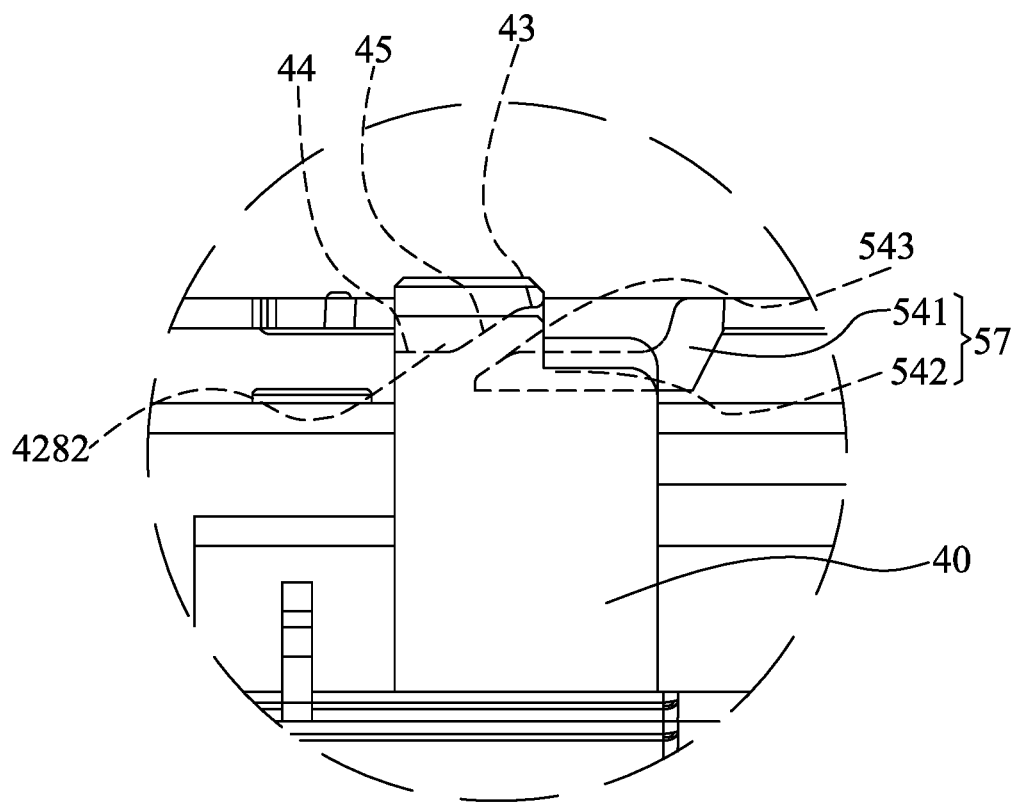
FIG. 12 is an enlarged view of an encircled portion XII of the adjustable scanning device of FIG. 11.
Figure 13:
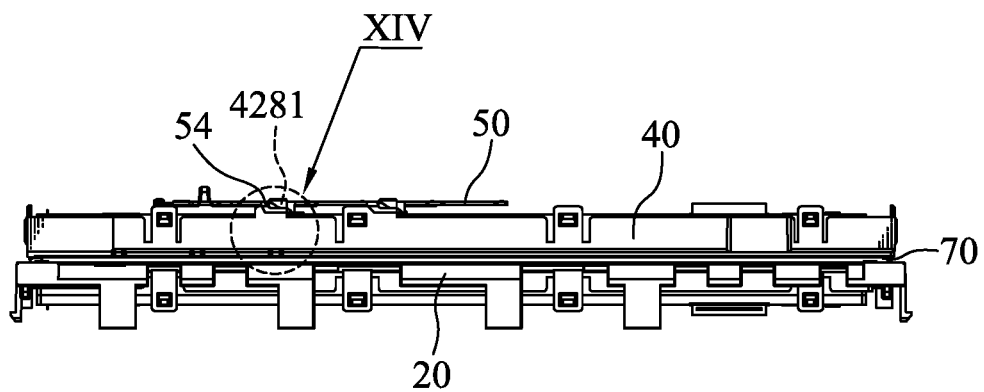
FIG. 13 is a schematic diagram of the adjustable scanning device of FIG. 1 showing that the first contact sensor, the second contact sensor, and the adjusting switch after being adjusted.
Figure 14:
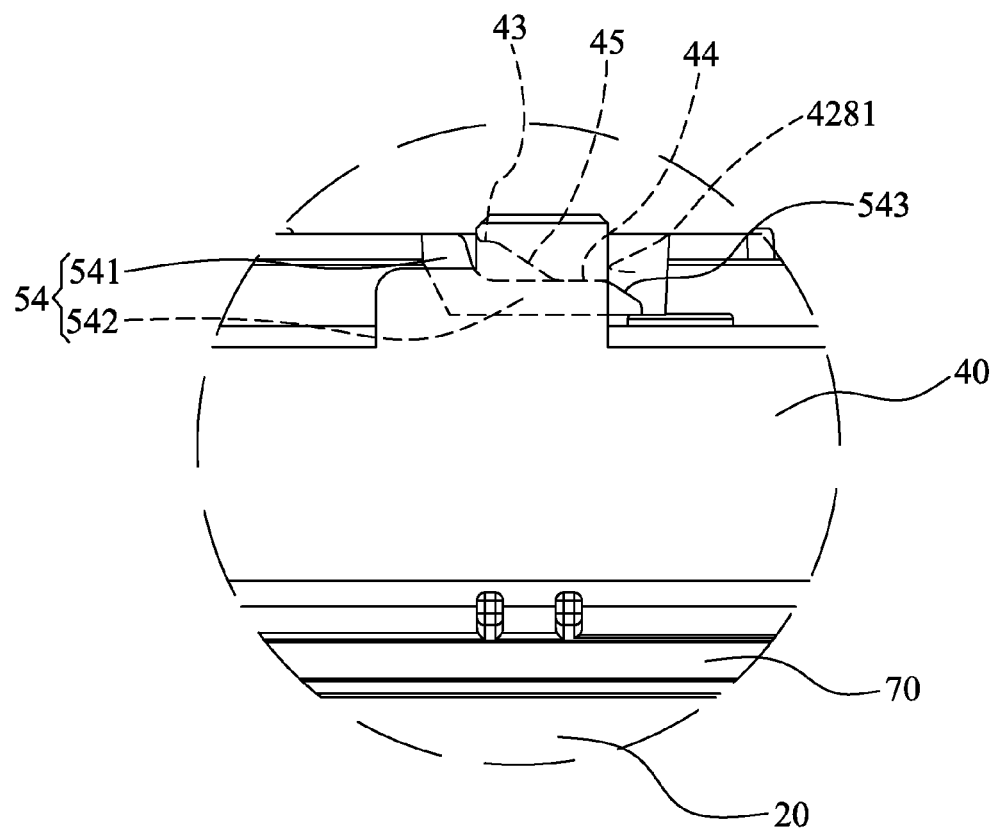
FIG. 14 is an enlarged view of an encircled portion XIV of the adjustable scanning device of FIG. 13.
Figure 15:
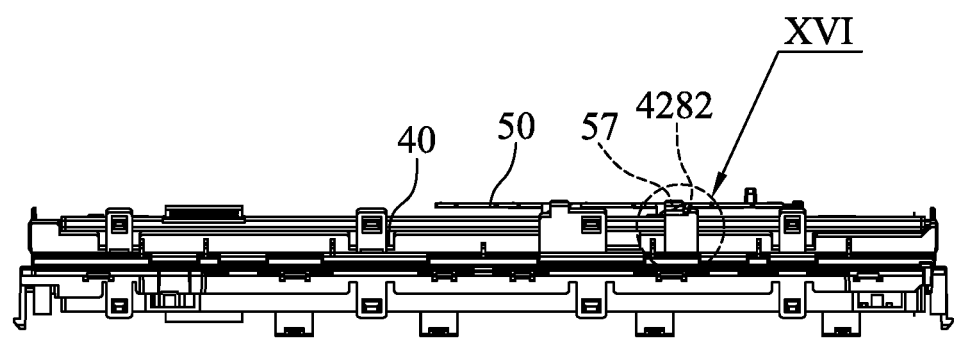
FIG. 15 is another schematic diagram of the adjustable scanning device of FIG. 1 showing that the first contact sensor, the second contact sensor, and the adjusting switch after being adjusted.
Figure 16:
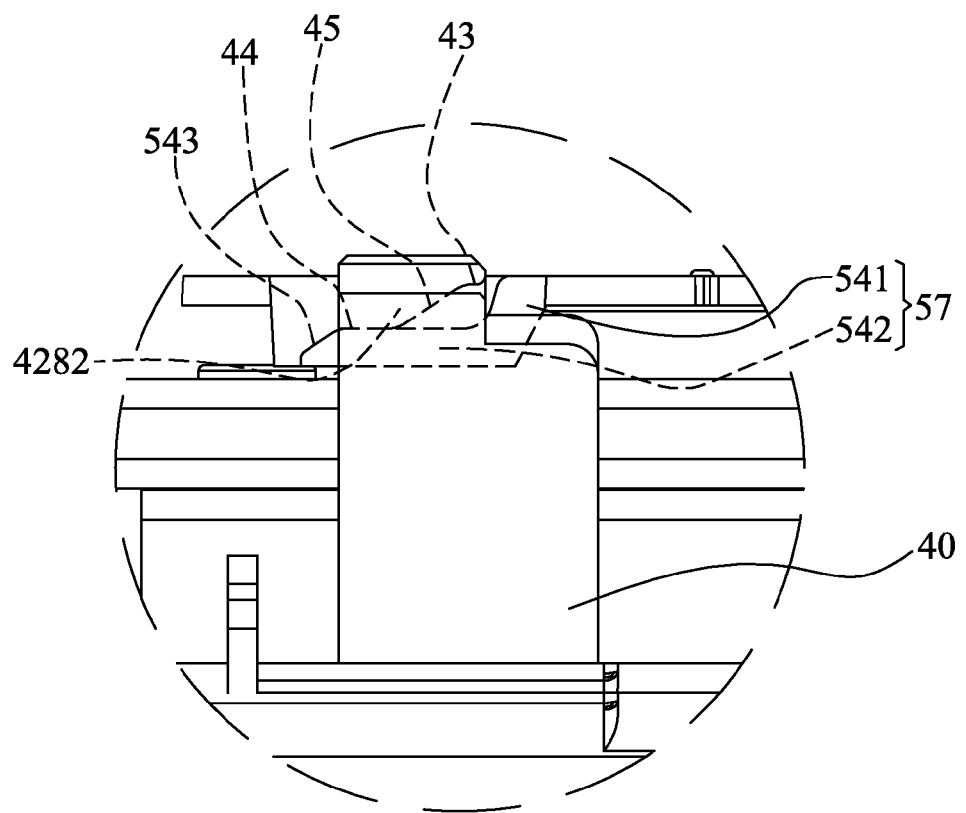
FIG. 16 is an enlarged view of an encircled portion XVI of the adjustable scanning device of FIG. 15.

Referring to FIG. 6 and FIG. 7, the adjusting switch 50 has a base board 51 extending transversely. One side of a top surface of the base board 51 protrudes upward to form a sliding block 52. The base board 51 opens a sliding groove 53. A front of the base board 51 defines a first lacking groove 551 passing through a front surface of the base board 51. A rear of the base board 51 defines a second lacking groove 552 passing through a rear surface of the base board 51. The front of the base board 51 has a first raising block 54 located in the first lacking groove 551, and the rear of the base board 51 has a second raising block 57 located in the second lacking groove 552. The first raising block 54 and the second raising block 57 have the same structure and are substantially L-shaped. Each of the first raising block 54 and the second raising block 57 has a first connecting portion 541, and a second connecting portion 542 connected with a bottom of the first connecting portion 541. One longitudinal wall of each of the first lacking groove 551 and the second lacking groove 552 protrudes downward to form the first connecting portion 541. The bottom of the first connecting portion 541 extends transversely to form the second connecting portion 542. A free end of the second connecting portion 542 has an inclined surface 543. A first enforcing board 561 is connected between the first raising block 54 and a transverse wall of the first lacking groove 551. And a second enforcing board 562 is connected between the second raising block 57 and a transverse wall of the second lacking groove 552.

Specifically, the front of the base board 51 defines two first lacking grooves 551 passing through the front surface of the base board 51 and arranged transversely. The rear of the base board 51 defines two second lacking grooves 552 passing through the rear surface of the base board 51 and arranged transversely. The front of the base board 51 has two first raising blocks 54 respectively located at the two first lacking grooves 551. The rear of the base board 51 has two second raising blocks 57 respectively located at the two second lacking grooves 552. The first raising blocks 54 and the second raising blocks 57 have the same structure and are substantially L-shaped. Each of the first raising blocks 54 and the second raising blocks 57 has the first connecting portion 541, and the second connecting portion 542 connected with the bottom of the first connecting portion 541.

A top surface of the free end of the second connecting portion 542 is inclined downward and sideward to form the inclined surface 543 matched with the guiding surface 45. The second connecting portion 542 is corresponding to one of the first lacking grooves 551 and the second lacking grooves 552. The first enforcing board 561 is connected between each of the first raising blocks 54 and a transverse wall of one of the first lacking grooves 551. The second enforcing board 562 is connected between each of the second raising blocks 57 and a transverse wall of one of the second lacking grooves 552.

Referring to FIG. 3 to FIG. 16, the base board 51 of the adjusting switch 50 is transversely slidably assembled to the inner cover 31 and located above the second contact sensor 40. The sliding block 52 is transversely slidably received in the opening 321. The base board 51 is slidably mounted to the top surface of the top wall of the assembling groove 311. Specifically, the base board 51 is slidably received in the receiving groove 313. A bottom of the limiting screw 314 passes through the sliding groove 53 to limit a wall of the sliding groove 53 being transversely slidably under a head of the limiting screw 314. The limiting screw 314 limits the adjusting switch 50 moving upward. The first raising block 54 is received in the first perforation 3151 and transversely movably located under the first guiding block 4281. The second raising block 57 is received in the second perforation 3152 and transversely movably located under the second guiding block 4282. The free end of the second connecting portion 542 is located under the blocking surface 43.

Referring to FIG. 1 to FIG. 16, a working principle of the adjustable scanning device 100 is described as follows. The cover 30 is mounted on the base 10. The adjustable scanning path 70 is formed between the second contact sensor 40 and the first contact sensor 20. The sliding block 52 of the adjusting switch 50 is pushed sideward, the base board 51 slides sideward by virtue of the sliding groove 53 moving along the limiting screw 314, the first raising block 54 moves towards and pushes against the first guiding block 4281 to move upward, and the second raising block 57 moves towards and pushes against the second guiding block 4282 to move upward, so the first guiding block 4281 and the second guiding block 4282 drive the fixing frame 42 together with the main portion 41 to move upward.

Specifically, each of the first raising block 54 and the second raising block 57 moves sideward by virtue of the inclined surface 543 slantwise moving downward along the guiding surface 45 until the horizontal supporting surface 44 abuts against the top surface of the free end of the second connecting portion 542, at the moment, the second contact sensor 40 moves upward with respect to the first contact sensor 20, so that a distance between the second contact sensor 40 and the first contact sensor 20 is increased, the width of the adjustable scanning path 70 located between the second contact sensor 40 and the first contact sensor 20 is enlarged, and the two springs 60 are compressed. Then the sliding block 52 is pushed backwards to push the base board 51 of the adjusting switch 50 backwards, the horizontal supporting surface 44 breaks away from the top surface of the free end of the second connecting portion 542, the two springs 60 are released, at the moment, the two springs 60 elastically push against the second contact sensor 40 to return the second contact sensor 40 to an original position.

Preferably, before the second contact sensor 40 is adjusted, the width of the adjustable scanning path 70 located between the second contact sensor 40 and the first contact sensor 20 is 0.7 mm. After the second contact sensor 40 is adjusted, the width of the adjustable scanning path 70 located between the second contact sensor 40 and the first contact sensor 20 is 1.2 mm.

As described above, the width of the adjustable scanning path 70 located between the second contact sensor 40 and the first contact sensor 20 is adjustable according to needs by virtue of the second contact sensor 40 being movably mounted to the cover 30 up and down and the second contact sensor 40 being located over the first contact sensor 20, so scanning objects with different thicknesses are capable of passing through the adjustable scanning path 70 successfully for proceeding an effective scanning. As a result, various requirements of users are satisfied.

What is claimed is:

1. An adjustable scanning device, comprising:
a base;
a first contact sensor mounted to the base and exposed to a top surface of the base;
a cover mounted on the base and located above the first contact sensor; and
a second contact sensor movably mounted to the cover up and down, and exposed to a bottom surface of the cover, the second contact sensor being located over the first contact sensor to form an adjustable scanning path located between the second contact sensor and the first contact sensor, a width of the adjustable scanning path being adjustable;
wherein the cover includes an inner cover pivotally mounted to the base and located above the first contact sensor, a substantial middle of a bottom surface of the inner cover is recessed inward to form an assembling groove extending transversely and located over the first contact sensor, the second contact sensor is movably assembled in the assembling groove and partially exposed out from the bottom surface of the inner cover.

2. The adjustable scanning device as claimed in claim 1, further comprising an adjusting switch and two springs elastically abutting between the second contact sensor and the inner cover, a top wall of the assembling groove opening a first perforation and a second perforation arranged longitudinally, tops of a front and a rear of the second contact sensor having a first guiding block and a second guiding block, respectively, the adjusting switch having a base board slidably mounted to a top surface of the top wall of the assembling groove, one side of a top surface of the base board protruding upward to form a sliding block, a front of the base board having a first raising block, and a rear of the base board having a second raising block, the first guiding block being received in the first perforation, the second guiding block being received in the second perforation, the first raising block being received in the first perforation and transversely movably located under the first guiding block, the second raising block being received in the second perforation and transversely movably located under the second guiding block, the sliding block being pushed sideward, the base board sliding sideward, the first raising block moving towards and pushing against the first guiding block to move upward, and the second raising block moving towards and pushes against the second guiding block to move upward, the second contact sensor moving upward with respect to the first contact sensor, the two springs being compressed, the sliding block being pushed backwards to push the base board backwards, the two springs being released, the two springs elastically pushing against the second contact sensor to return the second contact sensor to an original position.

3. The adjustable scanning device as claimed in claim 2, wherein the second contact sensor includes a main portion and a hollow fixing frame, the main portion is mounted to the fixing frame, the fixing frame is movably assembled in the assembling groove up and down.

4. The adjustable scanning device as claimed in claim 3, wherein two side walls of the assembling groove protrude inward to form two limiting blocks, the fixing frame has a bottom board, two opposite sides of the bottom board protrude upward to form two first lateral walls, the two first lateral walls define two limiting holes, respectively, the two first lateral walls are movably mounted to the two limiting blocks up and down, respectively by virtue of the two limiting holes of the two first lateral walls movably limiting the two limiting blocks up and down, a bottom surface of the bottom board is exposed to the bottom surface of the inner cover.

5. The adjustable scanning device as claimed in claim 4, wherein a front and a rear of the bottom board protrude upward to form two second lateral walls, a receiving space is surrounded among the bottom board, the two first lateral walls and the two second lateral walls, a middle of the bottom board opens a through-hole, the main portion is assembled in the receiving space, a bottom surface of the main portion is exposed to the bottom surface of the bottom board through the through-hole.

6. The adjustable scanning device as claimed in claim 5, wherein tops of a front and a rear of the fixing frame have a first extending arm and a second extending arm, respectively, the first extending arm and the second extending arm are respectively protruded upward from tops of the two second lateral walls, a top end of an inner surface of the first extending arm protrudes inward to form the first guiding block, a top end of an inner surface of the second extending arm protrudes inward to form the second guiding block, the first extending arm together with the first guiding block is received in the first perforation, the second extending arm together with the second guiding block is received in the second perforation.

7. The adjustable scanning device as claimed in claim 6, wherein the first raising block and the second raising block are substantially L-shaped, each of the first raising block and the second raising block has a first connecting portion, and a second connecting portion connected with a bottom of the first connecting portion, a free end of the second connecting portion has an inclined surface, a bottom surface of each of the first guiding block and the second guiding block is of a stair shape, the bottom surface of each of the first guiding block and the second guiding block has a blocking surface, a guiding surface inclined downward and sideward from a tail end of the blocking surface, and a horizontal supporting surface extended sideward and substantially opposite to the blocking surface from a tail end of the guiding surface, a free end of the second connecting portion is located under the blocking surface, the sliding block is pushed sideward, the base board slides sideward, each of the first raising block and the second raising block moves sideward by virtue of the inclined surface slantwise moving downward along the guiding surface until the supporting surface abuts against a top surface of the free end of the second connecting portion.

8. The adjustable scanning device as claimed in claim 7, wherein the front of the base board defines a first lacking groove passing through a front surface of the base board, the rear of the base board defines a second lacking groove passing through a rear surface of the base board, one longitudinal wall of each of the first lacking groove and the second lacking groove protrudes downward to form the first connecting portion, the bottom of the first connecting portion extends transversely to form the second connecting portion.

9. The adjustable scanning device as claimed in claim 7, wherein a first enforcing board is connected between the first raising block and a transverse wall of the first lacking groove, and a second enforcing board is connected between the second raising block and a transverse wall of the second lacking groove.

10. The adjustable scanning device as claimed in claim 2, wherein a portion of the top surface of the top wall of the assembling groove is recessed downward to form a receiving groove, the first perforation and the second perforation are opened in the receiving groove, the base board is slidably received in the receiving groove.

11. The adjustable scanning device as claimed in claim 10, wherein the base board opens a sliding groove, the inner cover is equipped with a limiting screw in the receiving groove, a bottom of the limiting screw passes through the sliding groove to limit a wall of the sliding groove being transversely slidably under a head of the limiting screw, the sliding block of the adjusting switch is pushed sideward, the base board slides sideward by virtue of the sliding groove moving along the limiting screw.

12. The adjustable scanning device as claimed in claim 2, wherein the cover includes an outer cover covered on the inner cover, the outer cover opens an opening, the sliding block is transversely slidably received in the opening.

\* \* \* \* \*